United States Patent
Balster et al.

(10) Patent No.: US 9,314,735 B2
(45) Date of Patent: *Apr. 19, 2016

(54) METHOD FOR SEPARATING GASES

(71) Applicant: EVONIK FIBRES GMBH, Schoerfling am Attersee (AT)

(72) Inventors: Joerg Balster, Schoerfling am Attersee (AT); Markus Ungerank, Perg (AT); Ingrid Winette Velthoen, Strass im Attergau (AT)

(73) Assignee: EVONIK FIBRES GmbH, Schoerfling am Attersee (AT)

( * ) Notice: Subject to any disclaimer, the term of this patent is extended or adjusted under 35 U.S.C. 154(b) by 2 days.

This patent is subject to a terminal disclaimer.

(21) Appl. No.: 14/364,501

(22) PCT Filed: Nov. 29, 2012

(86) PCT No.: PCT/EP2012/073901
§ 371 (c)(1),
(2) Date: Jun. 11, 2014

(87) PCT Pub. No.: WO2013/098024
PCT Pub. Date: Jul. 4, 2013

(65) Prior Publication Data
US 2014/0345457 A1    Nov. 27, 2014

(30) Foreign Application Priority Data

Dec. 27, 2011  (EP) .................................. 11195776

(51) Int. Cl.
*B01D 53/22* (2006.01)
*B01D 69/06* (2006.01)
(Continued)

(52) U.S. Cl.
CPC ............ *B01D 53/226* (2013.01); *B01D 53/225* (2013.01); *B01D 69/06* (2013.01); *B01D 69/08* (2013.01); *B01D 71/64* (2013.01); *C01B 23/0042* (2013.01); *B01D 63/02* (2013.01); *B01D 63/08* (2013.01);
(Continued)

(58) Field of Classification Search
CPC .... B01D 53/22; B01D 53/225; B01D 53/226; B01D 63/02; B01D 63/08; B01D 69/06; B01D 69/08; B01D 71/64; B01D 2053/221; B01D 2053/224; B01D 2210/007; B01D 2210/0046; B01D 2256/18; B01D 2311/06; B01D 2311/25; B01D 2317/022; B01D 2317/025; C01B 23/0042; C01B 2210/0031
USPC .......................... 95/45, 53; 96/4, 7, 9, 10, 14
See application file for complete search history.

(56) References Cited

U.S. PATENT DOCUMENTS 3,256,675 A * 6/1966 Robb ................................ 95/53
5,064,446 A * 11/1991 Kusuki et al. ..................... 95/53
(Continued)

OTHER PUBLICATIONS

International Preliminary Report on Patentability and Written Opinion issued Jul. 10, 2014 in PCT/EP2012/073901 with English language translation.
(Continued)

*Primary Examiner* — Jason M Greene
(74) *Attorney, Agent, or Firm* — Oblon, McClelland, Maier & Neustadt, L.L.P.

(57) ABSTRACT

The invention relates to a special apparatus, in particular linkage of gas separation membrane modules, and a special method for separating gas mixtures containing helium.

22 Claims, 2 Drawing Sheets

An example of an interconnection of a plurality of membrane modules according to the invention

(51) Int. Cl.
B01D 69/08 (2006.01)
B01D 71/64 (2006.01)
C01B 23/00 (2006.01)
B01D 63/02 (2006.01)
B01D 63/08 (2006.01)

(52) U.S. Cl.
CPC .... *B01D 2053/221* (2013.01); *B01D 2053/224* (2013.01); *B01D 2256/18* (2013.01); *B01D 2311/06* (2013.01); *B01D 2311/25* (2013.01); *B01D 2317/022* (2013.01); *B01D 2317/025* (2013.01); *C01B 2210/007* (2013.01); *C01B 2210/0031* (2013.01); *C01B 2210/0046* (2013.01)

(56) References Cited

U.S. PATENT DOCUMENTS

| | | | |
|---|---|---|---|
| 5,632,803 A * | 5/1997 | Stoner et al. | 95/53 |
| 6,168,649 B1 * | 1/2001 | Jensvold et al. | 95/47 |
| 6,425,267 B1 * | 7/2002 | Baker et al. | 95/47 |
| 6,565,626 B1 * | 5/2003 | Baker et al. | 95/47 |
| 6,630,011 B1 * | 10/2003 | Baker et al. | 95/47 |
| 8,999,038 B2 * | 4/2015 | Ungerank et al. | 95/51 |
| 2004/0168570 A1 * | 9/2004 | Franek | 95/50 |
| 2005/0268782 A1 | 12/2005 | Kulkarni et al. | |
| 2006/0196355 A1 * | 9/2006 | Ekiner et al. | 95/45 |
| 2011/0167821 A1 * | 7/2011 | Baker et al. | 96/9 |
| 2014/0243574 A1 * | 8/2014 | Karode | 95/53 |

OTHER PUBLICATIONS

Singaporean Office Action issued Mar. 27, 2015 in Patent Application No. 11201403605P.

International Search Report Issued Mar. 26, 2013 in PCT/EP12/073901 filed Nov. 29, 2012.

* cited by examiner

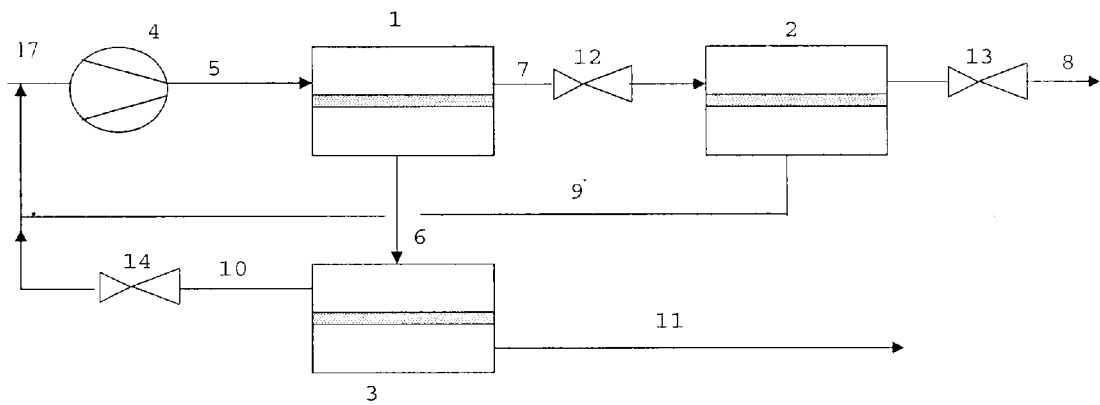
Fig. 1: An example of an interconnection of a plurality of membrane modules according to the invention
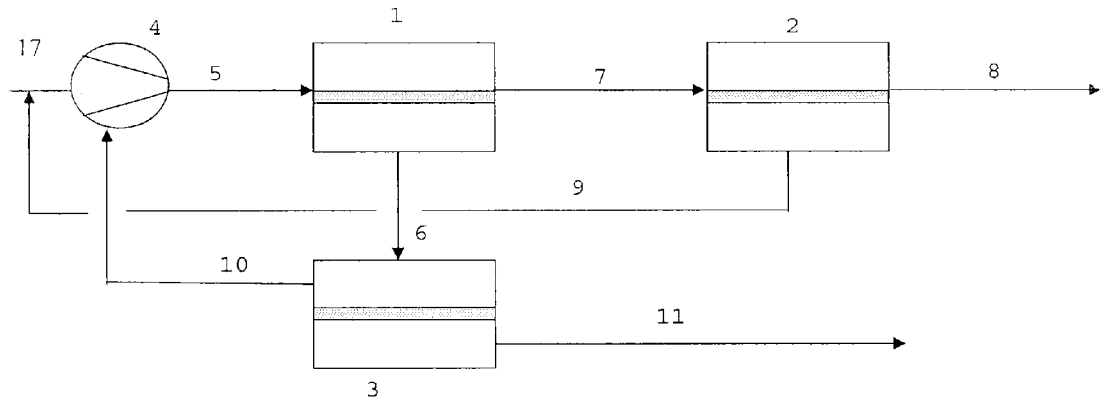
Fig. 2: 3-Stage interconnection of membrane modules with a compressor and retentate recycling of the membrane separation stage (3) without constriction into an increased compression stage

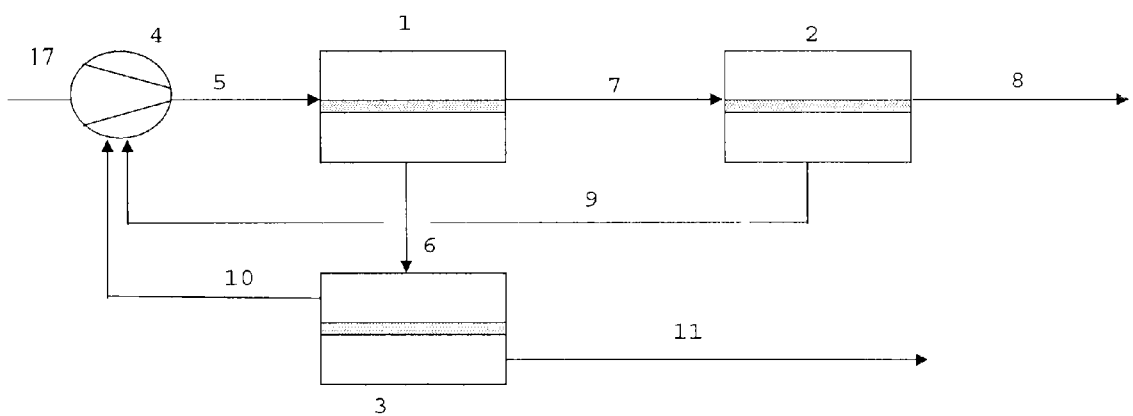
Fig. 3: 3-Stage interconnection of membrane modules with a compressor and retentate recycling of the third stage without constriction, and permeate recycling of the second stage into an increased compression stage

METHOD FOR SEPARATING GASES

CROSS REFERENCE TO RELATED APPLICATION

This application is a 371 of PCT/EP2012/073901, filed on Nov. 29, 2012, and claims priority to European Patent Application No. 11195776.7, filed on Dec. 27, 2011.

The invention relates to a special method and a special apparatus, in particular linkage of gas separation membrane modules, for separating gas mixtures containing helium and for producing helium in high purity.

Obtaining helium from gas sources is a very costly process in terms of energy and has hitherto been achieved essentially by means of cryogenic distillation.

To simplify this process and at least as a partial replacement of energy-intensive process steps such as e.g. cryogenic distillation, the use of membrane technology has been proposed. Thus, e.g. US 2005/0217479A1 and the prior art cited therein presents various examples of purifying helium from gas streams by means of membrane technologies. In the process described, however, only small purities of helium can be achieved; moreover, the yield is very poor.

It is generally known that gas mixtures can be separated by means of gas separation membranes on the basis of different permeabilities (=material flow per time unit, area, differential pressure and layer thickness) of the individual gases. In general, to produce such gas separation membranes, plastics are processed to give hollow fibres or flat membranes. The membranes are characterized by a very thin separation layer at the surface of the membrane so that the permeance (=material flow per time unit, area and differential pressure) of the membrane is as large as possible.

As well as new membrane materials, different ways of connecting membranes has also been investigated in the prior art. A series of single-stage or multi-stage membrane interconnections for separating gases are known in the literature. By way of example, mention may be made here as literature sources of: Baker, IndEngChemRes, Natural Gas Processing with Membranes, 47 (2008); Bhide MemSci, Hybrid processes for the removal of acid gases from natural gas, 1998; Hhenar, MemSci Application of Cardo-type polyimide (PI) and polyphenylene oxide (PPO) hollow, 2008; EP 0 603 798; EP 0 695 574; U.S. Pat. No. 5,753,011; EP 1 634 946; EP 0 596 268; U.S. Pat. Nos. 6,565,626 B1; 6,168,649 B1 and EP 0 799 634. The specified methods have the disadvantage that they in part include a plurality of recompression steps or that either only a high purity of the permeate gas or only a high purity of the retentate gas can be achieved. There have hitherto been no suitable membrane methods for simultaneously achieving high purities of permeate gas and retentate gas. There have also hitherto still not been any satisfactory solutions for the purification of helium carried out exclusively by means of membrane methods.

Proceeding from this prior art, the object of the present invention was to provide a method and also an apparatus for separating and purifying gas mixtures containing helium which do not have, or only have to a reduced extent, the disadvantages of the methods and apparatuses of the prior art. In particular, methods and apparatuses are to be provided which can simultaneously produce a permeate gas containing helium and also a retentate gas in high purities. In a further specific object, these methods and apparatuses should be advantageous in terms of set-up costs and operating costs and/or permit simpler implementation.

In a next special object, a method/apparatus that can be used as universally as possible for purifying helium should be provided. In particular, it should be possible to efficiently and effectively separate any gas streams, irrespective of the helium content, irrespective of the composition of the gas stream and irrespective of the content of the other components in the gas stream.

A further special object of the present invention was to keep the losses of helium compared to crude gas stream as low as possible.

Further objects not explicitly specified arise from the overall context of the claims, description, examples and figures which follow.

Surprisingly, it has now been found that pure streams of permeate (helium stream) and retentate can be obtained by the method according to claim 1 and the apparatus according to claim 2 or one of the claims dependent thereon without more than one compressor being required. The apparatus according to the invention simultaneously allows helium and a retentate stream to be obtained in high purity. The set-up costs for the plant are low; it does not require additional down-stream purification methods. Consequently, it was possible to achieve the set objects with a pure membrane separation method.

The present invention therefore provides the apparatus and method claimed in the claims and also explained in more detail in the description below and the examples.

The present invention is described below in detail. Beforehand, some important terms are defined.

The quotient of the permeances of two individual gases gives the selectivity of the membrane for separation with regard to the two gases and thus indicates how well the membrane can separate a gas mixture with regard to the two components.

Permeate refers to the total stream which is produced on the low-pressure side of the membrane, membrane modules or membrane separation step.

Permeate gas is used to refer to the component/components enriched in each case at the membrane, at the membrane module, or in the membrane separation step in the permeate stream compared with the respective entry stream.

Retentate is used to refer to the total stream which is produced on the high-pressure side of the membrane, membrane module or membrane separation step which does not pass through the membrane.

Retentate gas is used to refer to the component/components enriched in each case at the membrane, at the membrane module, or in the membrane separation step in the retentate stream compared to the respective entry stream.

Crude gas or crude gas mixture or crude gas stream (17) refers to a gas mixture of at least two gases or a stream of this gas mixture which is to be separated by means of the method according to the invention and/or the apparatus according to the invention and which comprises helium as one component. The content of helium can vary within any desired limits, but is preferably between 0.01 and 80% by volume, particularly preferably 0.1 and 20% by volume and very particularly preferably 1 to 10% by volume. The crude gas stream can be an untreated gas stream, e.g. by-product or waste-gas streams from processes etc. or a gas stream, e.g. from a cryogenic distillation, which has already been worked up for the purposes of increasing the helium fraction. Examples of suitable gas streams are processing gases in which helium is used e.g. as protective atmosphere.

Feed stream (5) refers to a gas stream of helium and at least one other component which is fed to the feed stream separation stage (1). This stream can correspond to the crude gas stream (17) and/or to the crude gas stream compressed by a compressor. After recycling the second permeate stream (9)

and/or the third retentate stream (10), however, the feed stream (5) is composed of the gases of the crude gas stream (17), those of the second permeate stream (9) and/or of the third retentate stream (10). The feed stream (5) is preferably generated by the streams (9) and (10) either both being mixed with the uncompressed crude gas stream (17) or both with the compressed crude gas stream or one with the uncompressed crude gas stream and one with the compressed crude gas stream, or by the streams (9) and/or (10) being mixed with the crude gas stream (17) in the compressor. Combinations of the variants described above are encompassed by the present invention.

Feed stream separation stage (1) refers to a membrane separation stage for separating the feed stream (5) into a first permeate stream (6) enriched with regard to helium compared to the feed stream (5) and a first retentate stream (7) depleted with regard to helium compared to the feed stream (5).

Retentate separation stage (2) refers to a membrane separation stage, which can have the same or different design to the feed stream separation stage (1), for separating the first retentate stream (7) into a second permeate stream (9) enriched with regard to helium compared to the first retentate stream (7), and a second retentate stream (8) depleted with regard to helium compared to the first retentate stream (7).

Permeate separation stage (3) refers to a membrane separation stage, which can have the same or different design to feed stream separation stage (1) and/or retentate separation stage (2), for separating the first permeate stream (6) into a third retentate stream (10) depleted with regard to helium compared to the first permeate stream (6), and a third permeate stream (11) enriched with regard to helium compared to the first permeate stream (6).

By reference to the preferred and special embodiments of the method according to the invention described below, and also the preferred and particularly suitable embodiments and also the drawings and descriptions of the drawings, the invention is merely described in more detail by way of example, i.e. it is not limited to these embodiments and application examples or to the respective combinations of features within individual embodiments.

Individual features which are given and/or presented in connection with specific embodiments are not limited to these embodiments or the combination with the other features of these embodiments, but can be combined, within the scope of technical possibilities, with any other variants, even if these are not treated separately in the present documents.

The same reference numerals in the individual figures and depictions of the drawings refer to identical or similar, or identically or similarly acting, components. By reference to the depictions in the drawing, those features are also emphasized which are not provided with reference numerals, irrespective of whether such features are described below or not. On the other hand, features which are contained in the present description but are not visible or shown in the drawing are directly self-evident for a person skilled in the art.

The apparatus according to the invention, see for example FIGS. 1 to 3, includes an interlinking of at least three membrane separation stages. Each stage consists of one or more physical gas separation modules which are connected in parallel and/or in series within one stage. The driving force generated for separating the gas into the modules is a partial pressure difference between the retentate side and the permeate side in the respective membrane separation stages. The partial pressure difference can be generated either by means of a compressor (4), which is arranged on the feed side of the feed stream separation stage (1) and/or by means of at least one, preferably one or two, vacuum pump(s) (not shown in FIGS. 1 to 3) preferably on the permeate side of the retentate separation stage (2) in the second permeate stream (9) and/or on the permeate side permeate separation stage (3) in third permeation stream (11). Optionally, it may be advantageous to generate and/or to boost the partial pressure difference in one or more of the membrane separation stages by means of a permeate-side flushing-gas stream.

In a preferred embodiment of the present invention, a compressor (4) brings the crude gas mixture or the gas mixture of the crude gas stream (17) and the second permeate stream (9) and/or the third retentate stream (10) to the desired pressure in the range from 5 to 100 bar, but preferably to a pressure of 5 to 50 bar or particularly preferably 10 to 25 bar. The resulting feed stream (5) is fed into the feed stream separation stage (1). In the feed stream separation stage (1), a preseparation of the crude gas mixture into more readily permeating components (permeate gas), which to a large extent ends up in the permeate of the first stage, and less rapidly permeating components (retentate gas), which are predominantly retained by the membrane and accumulate in the retentate, is obtained.

The method according to the invention and/or the apparatus according to the invention can be carried out, especially when purifying crude helium, without recycling the material streams (9) and (10) (see Example 2).

However, particularly if the helium content in the crude gas stream (17) is very low and/or a high purity of helium in the third permeate stream (11) is desired, the method according to the invention and/or the apparatus according to the invention is characterized, in a preferred variant, by the fact that it is designed in such a way that the concentration of helium in the feed stream (5) is increased as a result of the recycling of the second permeate stream (9) and of the third retentate stream (10), preferably by at least 2%, particularly preferably by at least 3%, very particularly preferably by 4 to 10% and especially preferably by 5 to 10%, in each case compared to the helium concentration in the crude gas stream (17). The increase can depend on the composition of the crude gas stream (17) and is particularly marked at low concentrations of helium (0.01 to 10%). As a rule, the increase in the concentration of helium is between 2 and 10%, particularly preferably between 3 and 5%, when the content of the permeate gas in the crude gas stream (17) is between 2 and 7%.

The inventors have discovered that the yield for the overall process of helium and retentate gas increases and thus the gas loss decreases if the concentration of the helium in the feed stream separation stage (1) is increased. At the same stage separation cut (=ratio of permeate stream to feed stream of the stage in question), considerably less helium ends up in the retentate of the feed stream separation stage (1) if the concentration at least of the helium in the feed stream (5) is increased. Analogously, a lowering of the yield was established if the concentration of helium in the feed stream (5) to be purified is reduced compared to the crude gas stream. Thus, the stage separation cut for a concentration of 10% helium in the feed stream (5) to be purified is between 2 and 30%, preferably between 5 and 25% and particularly preferably between 10 and 15%. In a particularly preferred embodiment of the present invention, the method according to the invention and/or the apparatus according to the invention is therefore designed in such a way that the content of helium in the feed stream (5) is greater than or equal to 2% by volume, preferably more than 5% by volume and very particularly more than 10% by volume, based on the volume of the feed stream (5), after recycling the second permeate stream (9) and the third retentate stream (10).

As already explained, this increase in the concentration of helium in the feed stream (5) increases the efficiency of the feed stream separation stage (1), which in turn results in less retentate gas entering the first permeate stream (6). This in turn increases the efficiency of the permeate separation stage (3) and ensures that, here too, less undesired retentate gas passes into the third permeate stream (10).

In general, it is possible to say that, in the feed stream separation stage (1), preferably 20 to 100%, particularly preferably 30 to 90% and very particularly preferably 40 to 70%, of helium pass from the feed stream (5) to the permeate.

The retentate of the feed stream separation stage (1)) is fed, optionally with pressure reduction by means of an optionally present pressure relief valve (12) or with pressure increase, by means of the first retentate stream (7), to the retentate separation stage (2) where the fine purification of the retentate stream (7) takes place. On the retentate side of the retentate separation stage (2), i.e. in the second retentate stream (8), there is preferably a pressure relief valve (13), by means of which the pressure in the system can be maintained and kept constant. The content of less readily permeating components or of a retentate gas B is further increased in the retentate separation stage (2) so that the content of component B or of a retentate gas B in the second retentate stream (8) is preferably more than 80% by volume, particularly preferably more than 90% by volume, very particularly preferably 90 to 99.9% by volume and especially preferably 92% to 99.5% by volume. In a particularly preferred variant, the method according to the invention and/or the apparatus according to the invention is characterized in that at least 95% by volume, preferably at least 97% by volume, particularly preferably at least 99% by volume and very particularly preferably at least 99.5% by volume, of the retentate component of the feed stream separation stage (1) introduced into the apparatus with the crude gas stream (17) are removed from the system via the second retentate stream (8).

The stage separation cut of the retentate separation stage (2) for a concentration of the helium of 5% in the first retentate stream (7) is between 2 and 30%, preferably between 5 and 15%.

The helium-containing permeate of the retentate separation stage (2) is recycled by means of the second permeate stream (9), fed to the feed stream (5) and reprocessed—which is preferred—or it is discarded. As already explained above in the definition of the term "feed stream", the recycling can take place in different ways depending on whether a compressor (4) or even a multistage compressor (4) is used. In the case of a single-stage compressor (4), the second permeate stream (9) is preferably fed to the suction side of the compressor (4) (see FIG. 1). If a multistage compressor is used, then it is preferred for the second permeate stream (9) to be introduced into the compressor between two compression stages (see FIGS. 2 and 3).

The permeate of the feed stream separation stage (1) heavily enriched with helium is passed to the permeate separation stage (3) by means of the first permeate stream (6). If necessary, a pressure relief valve (14) in the retentate stream of the permeate separation stage (3), i.e. the third retentate stream (10), can be used to prevent the pressure of the permeate of the feed stream separation stage (1) dropping to ambient pressure (see FIG. 1). In this way, the driving force for the permeate separation stage (3) can be retained. The permeate separation stage (3) preferably produces a permeate (helium product stream) with a content of helium greater than 50% by volume, preferably 70 to 99.9% by volume, particularly preferably 80 to 99% by volume, especially preferably 85 to 98% by volume and very specifically preferably 90 to 96% by volume, which is removed from the apparatus via the third permeate stream (11). In a particularly preferred embodiment, the apparatus according to the invention is designed such that at most 50% by volume, preferably at most 30% by volume, particularly preferably at most 1 to 20% by volume, very particularly preferably at most 2 to 15% by volume and especially preferably 4 to 10% by volume, of the retentate component of the feed stream separation stage (1) introduced into the apparatus with the crude gas stream (17) are removed from the system via the third permeate stream (11). In a further particularly preferred variant, the method according to the invention and/or the apparatus according to the invention are thus characterized in that at least 95% by volume, preferably at least 97% by volume, particularly preferably at least 99% by volume and very particularly preferably at least 99.5% by volume, of the helium of the feed stream separation stage (1) introduced into the apparatus with the crude gas stream (17) are removed via the third permeate stream (11).

The stage separation cut of the permeate separation stage (3) is between 30 and 95%, preferably between 50 and 70%.

The third retentate stream (10) is recycled, fed to the feed stream (5) and reprocessed—which is preferred—or it is discarded. As already explained above, the recycling can take place in different ways and can depend for example on whether a compressor (4) or even a multistage compressor (4) is used. In the case of a single-stage compressor (4), the third retentate stream (10) is preferably fed to the suction side of the compressor (4) (see FIG. 2). If a multistage compressor is used, then it is preferred for the third retentate stream (10) to be introduced into the compressor between two compression stages (see FIGS. 2 and 3).

In a particularly preferred embodiment, the method according to the invention or the apparatus according to the invention is characterized in that it is designed in such a way that the gas volume recycled in the second permeate stream (9) and in the third retentate stream (10) is in total less than 50% by volume, preferably 5 to 40% by volume, very particularly preferably 5 to 30% by volume and especially preferably 10 to 25% by volume, of the volume of the crude gas stream (17). Controlling the amount of recycling gas streams can be effected e.g. by means of selection of the respective membrane modules in the membrane separation stages (1) to (3) or by means of control and regulation of pressures in the system or by means of the flow rates. Consequently, the method according to the invention or the apparatus is characterized in that, despite very low backflows, the increase in the concentration of helium in the feed stream (5), explained in more detail above, is ensured. This increases the efficiency of the overall method considerably.

The first permeate stream (6) is preferably conveyed such that the feed pressure of the permeate separation stage (3), preferably by means of a pressure relief valve (14) on the retentate side of the permeate separation stage (3), is 1 to 30 bar, preferably 2 to 20 bar and particularly preferably 2 to 10 bar.

As already explained, it is particularly advantageous if a multistage compressor (4) is used. In this case, a complete decompression of the retentate of the permeate separation stage (3) can be dispensed with since the retentate of the permeate separation stage (3) can be fed in between two compressor stages of the compressor (4) (see FIGS. 2 and 3).

Since the retentate separation stage (2) upon decompression to feed pressure would generally be operated in the selectivity-limited pressure range, it may be useful to decompress the second permeate stream (9) merely to a higher pressure level of a multistage pressure increasing unit, i.e. of a multistage compressor (4) since the operating costs of the compression unit are thus reduced without significantly impairing the separation result. In a particularly preferred embodiment of the present invention, a multistage compressor (4) is therefore used and the gas streams (9) and (10) are fed to this compressor in each case between two compression stages. Such an interconnection is shown in FIG. 3.

As already mentioned, the apparatus according to the invention can comprise one or more pressure relief valves (12), (13) or (14). In a preferred embodiment, it is ensured, preferably by means of a pressure relief valve (14), that the pressure drop over the feed stream separation stage (1) is limited to 1 to 30 bar, preferably 2 to 20 bar and particularly preferably 3 to 10 bar. At the same time or alternatively, it is ensured, preferably by means of a pressure relief valve (13), that the pressure drop over the feed stream separation stage (1) and the retentate separation stage (2) is limited to 1 to 100 bar, preferably 5 to 80 bar and particularly preferably 10 to 70 bar.

The apparatus according to the invention or the method according to the invention can in principle be realized with all membranes which are able to separate binary gas mixtures or multigas mixtures. The membrane materials used are preferably, but not exclusively, plastics. Suitable plastics in the separation-active layer are particularly preferably polyimides, polyamides, polysulphones, cellulose acetates and derivatives, polyphenylene oxides, polysiloxanes, polymers with intrinsic microporosity, mixed matrix membranes, facilitated transport membranes, polyethylene oxides, polypropylene oxides, carbon membranes or zeolites or mixtures thereof.

In a particularly preferred embodiment of the present invention, the gas separation membrane modules have a mixed gas selectivity (=ratio of the He-enriched material stream to the He-depleted material stream via the membrane) for helium/methane or for helium/nitrogen of at least 40, preferably 50 to 400, particularly preferably 100 to 350 and very particularly preferably 150 to 300. For helium/methane, the invention moreover also includes the specifically preferred embodiments with mixed gas selectivities of 200 to 350 and very especially preferably from 250 to 300. These highly selective membranes have the advantage that the separation is more effective and less permeate from the retentate separation stage (2) and/or less retentate from the permeate separation stage (3) has to be recycled. Their use is therefore a good option to regulate the recycle streams according to the invention. Furthermore, in the event of their use and when using a single-stage compressor (4), less gas has to be double-compressed, which is associated with economic advantages when operating the plant. With these very selective membrane modules, only up to 30%, preferably up to 20%, particularly preferably up to approx. 10%, of the gas introduced as crude gas into the feed stream separation stage (1) has to be double-compressed, with a membrane module with a selectivity of only 40 and without other regulating measures, it is possible that the double compression is up to 50%. For membranes with a mixed gas selectivity below 40, a concentration to above 50% helium in the product gas with the stated helium content range of the crude gas is barely possible. The above data refer to experiments in which a gas mixture with 0.4 to 7% helium and a second component B (=feed) were charged, where more than 99% of component B were present in the retentate gas of stage (2) and more than 50% of helium were present in the permeate stream of stage (3).

The use of such highly selective membranes is thus a preferred option for conducting the process according to the invention in a significantly more economical manner and reducing the necessary size of the compressor and the required energy.

Particularly preferred membranes have, as materials for the separation-active layer or as material for the complete membrane, a polyimide of the general formula

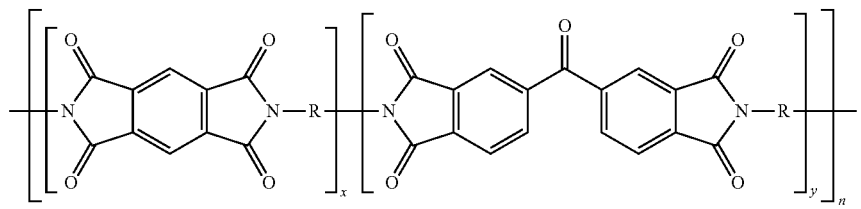

R is selected from the group consisting of

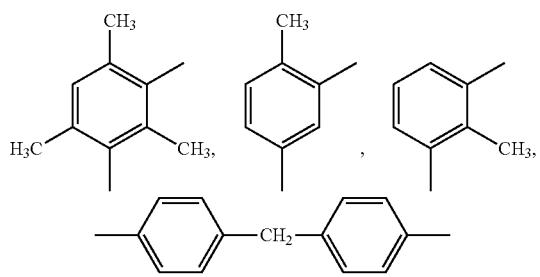

x, y: mole fraction where 0<x<0.5 and 1>y>0.5.

Very particularly preferred membranes comprise, as material for the separation-active layer of the membranes, a polyimide comprising 10 to 90% by weight, preferably 15 to 25% by weight and very particularly preferably 20% by weight of

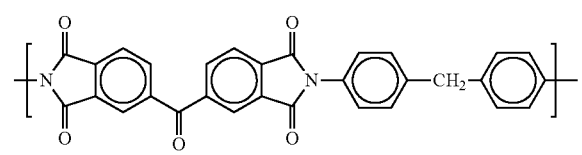

and 90 to 10% by weight, preferably 85 to 75% by weight and very particularly preferably 80% by weight of

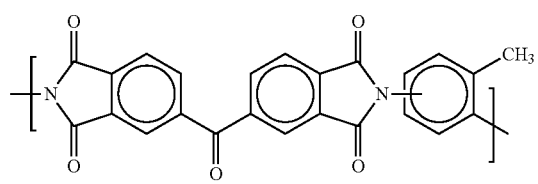

Particularly preferred polyimides point are registered in Chemical Abstracts under the numbers: CAS no. 9046-51-9 and CAS no. 134119-41-8.

The preparation of such membranes is described in US 2006/0196355 and in WO 2011/009919. To avoid pure repetitions, the content of these two patent specifications is incorporated in its entirety into the content of the present description. Particular preference is given to the membranes according to WO 2011/009919 which, compared with the membranes from US 2006/0196355, as well as the simpler and more cost-effective preparation, have the advantage that they have improved resistance in the method according to the invention. In particular, they have better thermal resistance.

Particularly preferred membranes are available from Evonik Fibres GmbH under the name Polyimide P84 and very particularly as Polyimide P84 HT.

According to the invention, the membranes are preferably used in the form of hollow fibre membranes and/or flat membranes. The membranes are built up to give modules which are then used in the separation task. Modules which can be used are all gas separation modules known in the art, such as, for example, but not exclusively, hollow fibre gas separation modules, spiral wound gas separation modules, cushion gas separation modules or tube-bundle gas separation modules.

The method according to the invention/the apparatus according to the invention has in particular the advantages that it is a pure membrane method.

Furthermore, with the method according to the invention/ the apparatus according to the invention, it is possible to simultaneously produce a pure retentate stream (8) and a pure permeate stream (11).

A further advantage is considered to be the fact that the method according to the invention/the apparatus according to the invention makes do with considerably less expenditure in terms of apparatus and energy than the known prior art methods.

In particular, by virtue of the combination of the features according to the invention controlling the amount of recycled retentate stream and increasing the permeate component in the feed stream (5), and also in the particularly preferred embodiments of the feature mixed gas selectivity, it is possible to provide an apparatus or a method which is considerably superior to the prior art methods.

As described above, the method according to the invention can be used in order to obtain high-purity helium streams. In principle, however, the method can also be used in order to produce "crude helium". "Crude helium" refers to helium with a purity of 50 to 70% by volume of helium, which can be fed to a further processing or purification elsewhere. The method according to the invention can thus entirely replace conventional helium work-up plants. It may, however, also replace only parts or part steps. It thus permits the greatest possible flexibility.

A conventional helium work-up method from gas mixtures consists e.g. of the steps:
  a) removal of $CO_2$, e.g. by amine absorption
  b) drying, e.g. via molecular sieve
  c) hydrocarbon removal, e.g. via activated carbon
  d) helium concentration, e.g. via fractional distillation giving a "crude helium" with a purity of 50 to 70% by volume
  e) $N_2$ and $CH_4$ removal, e.g. by cooling to −193° C.
  f) catalytic conversion of $H_2$ to $H_2O$
  g) optionally further work-up steps
This gives helium with a purity up to 99.99% by volume.

The method according to the invention can replace here in particular steps d) and/or e), but also the other steps mentioned.

Measurement Methods:

To determine the mixed gas selectivity $He/CH_4$ or $He/N_2$, membrane modules are operated with a mixture of 50% He and 50% $N_2$ or 50% He and 50% $CH_4$ at room temperature (23° C.) in the feed. The composition of the permeate and of the retentate are measured here at various pressures (5, 10, 15, 20 bar (g)). These measurements can then be used to calculate the permeances of the He and of the $N_2$ or $CH_4$ for the overall measured pressure range (5 to 20 bar). The ratio of these permeances then corresponds to the mixing gas selectivity.

The examples below are intended to illustrate and describe the present invention in more detail, but not limit it in any way.

EXAMPLES

General Preliminary Remark

The examples below are based on simulation calculations. The basis is membrane modules comprising 619 hollow fibre membranes of P84HT. The actual mixed gas selectivity is $He/N_2=175$ and $He/CH_4=290$. For the simulation calculations, however, only the following mixed gas selectivities were taken as a basis: $He/N_2=150$ and $He/CH_4=250$.

For the simulation calculations, it was assumed that the interconnection shown in FIG. 1 is used. Each membrane separation stage consists of the aforementioned modules.

1 m³/h of a crude gas mixture with the composition given in the examples is introduced into a mixing chamber and then, optionally together with recycled gas from gas streams (9) and (10), compressed to the pressure given in the examples. The compressed gas cooled to 20° C. is applied to the feed stream separation stage (1). The retentate of this stage is fed by means of the first retentate stream (7) to the retentate separation stage (2). A reducing valve (13) on the retentate side of the retentate separation stage (2) determines the driving force through the membrane of the membrane separation stages (1) and (2). The pressure drop over the membrane of the stage (1) does not go as far down as ambient pressure but is limited by a reducing valve (14) on the retentate side of the permeate separation stage (3) to the pressure stated in the examples. The sum of recycled gas streams (9) and (10) is given in the examples below.

Example 1 According to the Invention

Preparation of "Crude Helium"

The crude gas stream prepared in a mixer is a mixture of
0.4% by volume He
16.1% by volume $N_2$
83.5% by volume $CH_4$.

The sum of the recycled material streams (9) and (10) was 14% by volume. The feed pressure was 20 bar(a). The helium yield based on the amount of helium used was >97% by weight. Further compositions and pressures of the gas streams obtained can be found in table 1 below.

TABLE 1

|  | He [vol. %] | $N_2$ [vol. %] | $CH_4$ [vol. %] | Pressure p [bar (a)] |
|---|---|---|---|---|
| Feed stream (5) after 1st recycling | 2.91 | 16.37 | 80.72 | 20.07 |
| First permeate stream (6) | 22.9 | 18.51 | 58.59 | 2.31 |
| First retentate stream (7) | 1.78 | 16.25 | 81.97 | 20.07 |
| Second retentate stream (8) | 0.01 | 16.13 | 83.86 | 20.00 |

TABLE 1-continued

|  | He [vol. %] | $N_2$ [vol. %] | $CH_4$ [vol. %] | Pressure p [bar (a)] |
|---|---|---|---|---|
| Second permeate stream (9) | 26.67 | 17.9 | 55.43 | 0.28 |
| Third retentate stream (10) | 18.18 | 19.38 | 62.44 | 2.3 |
| Third permeate stream (11) = He product stream | 69.9 | 9.8 | 20.3 | 1 |

From a comparable crude gas mixture in the closest prior art, namely US 2005/0217479, Example 4, only a helium concentration of 10% by volume is achieved. The helium yield is 62%. This confirms the significant technical progress which has been achieved by the method according to the invention.

Example 2 According to the Invention

Preparation of Helium with High Purity from "Crude Helium"

The crude gas stream prepared in a mixer is a "crude helium mixture" of

50% by volume He
46% by volume $N_2$
3% by volume $CH_4$
1% by volume $H_2$.

There is no recycling of material streams (9) and (10). The feed pressure was 16 bar(a). A product stream (11) (1 bar(a)) with the following composition was obtained:

90.2% by volume He
7.7% by volume $N_2$
0.3% by volume $CH_4$
1.8% by volume $H_2$.

The retentate stream (8) (16 bar(a)) had the following composition:

0.7% by volume He
93.0% by volume $N_2$
6.3% by volume $CH_4$
0.1% by volume $H_2$.

The helium yield was >99% by weight. This shows that in already highly purified helium stream can be obtained a one process step and in high yields with the method according to the invention.

Example 3 According to the Invention

Preparation of Helium with High Purity

3a) The crude gas stream prepared in a mixer is a mixture of

3% by volume He
16.1% by volume $N_2$
80.9% by volume $CH_4$.

The sum of the recycled material streams (9) and (10) was 14% by volume. The feed pressure was 20 bar(a). The helium yield based on the amount of helium used was >95% by weight. Further compositions and pressures of the gas streams obtained can be found in table 2 below.

TABLE 2

|  | He [vol. %] | $N_2$ [vol. %] | $CH_4$ [vol. %] | Pressure p [bar (a)] |
|---|---|---|---|---|
| Feed stream (5) after 1st recycling | 7.03 | 16.07 | 76.9 | 20.08 |
| First permeate stream (6) | 49.72 | 12.46 | 37.82 | 2.32 |
| First retentate stream (7) | 3.53 | 16.37 | 80.1 | 20.08 |
| Second retentate stream (8) | 0.03 | 16.56 | 83.41 | 20.00 |
| Second permeate stream (9) | 43.23 | 14.19 | 42.58 | 0.28 |
| Third retentate stream (10) | 24.14 | 18.53 | 57.33 | 2.3 |
| Third permeate stream (11) = He product stream | 94.96 | 1.73 | 3.31 | 1 |

3b) The crude gas stream prepared in a mixer is a mixture of

6% by volume He
16.1% by volume $N_2$
77.9% by volume $CH_4$.

The sum of the recycled material streams (9) and (10) was 15% by volume. The feed pressure was 20 bar(a). The helium yield was >97% by weight. Further compositions and pressures of the gas streams obtained can be found in table 3 below.

TABLE 3

|  | He [vol. %] | $N_2$ [vol. %] | $CH_4$ [vol. %] | Pressure p [bar (a)] |
|---|---|---|---|---|
| Feed stream (5) after 1st recycling | 10.26 | 16.04 | 73.7 | 20.08 |
| First permeate stream (6) | 63.14 | 9.44 | 27.42 | 2.32 |
| First retentate stream (7) | 4.15 | 16.80 | 79.05 | 20.08 |
| Second retentate stream (8) | 0.03 | 17.09 | 82.88 | 20.00 |
| Second permeate stream (9) | 46.47 | 13.77 | 39.76 | 0.28 |
| Third retentate stream (10) | 26.69 | 18.53 | 54.78 | 2.3 |
| Third permeate stream (11) = He product stream | 97.62 | 0.85 | 1.53 | 1 |

These examples show that helium with high purity can be obtained with the method according to the invention without producing crude helium as intermediate and consequently two steps of the classic helium preparation can be replaced.

Example 4 According to the Invention

Preparation of Helium with High Purity from a He/$N_2$ Gas Stream

In a mixer, a mixture of
2.7% by volume He
97.3% by volume $N_2$
is prepared.

The sum of the recycled material streams (9) and (10) was 20% by volume. The feed pressure was 16 bar(a). A product stream (11) (1 bar(a)) with >90% helium content and a retentate stream (8) (16 bar(a)) with a helium content of 0.04% by volume was obtained.

The helium yield was >99.5% by weight. This shows that an already highly purified helium stream and simultaneously a high-purity retentate stream can be obtained with the method according to the invention in one process step and in high yields.

In the closest prior art, namely US 2005/0217479, Example 3, only a helium concentration of 28% by volume is achieved from a comparable crude gas mixture. The helium yield is 75%. The retentate stream still contains 0.7% by volume helium. This once again confirms the significant technical progress which has been achieved through the method according to the invention. The method according to the invention can produce not only an already highly enriched helium stream, it also simultaneously gives an ultrapure $N_2$ stream and therefore two valuable products at the same time.

LIST OF FIGURES

FIG. 1: Example of an interconnection of a plurality of membrane modules according to the invention FIG. 2: 3-Stage interconnection of membrane modules with a compressor and retentate recycling of the permeate separation stage (3) without total decompression in an increased compression stage of the compressor (4)

FIG. 3: 3-Stage interconnection of membrane modules with a compressor and retentate recycling of the third stage without total decompression and permeate recycling of the second stage to an increased compression stage of the compressor (4)

LIST OF REFERENCE NUMERALS

1: Feed stream separation stage
2: Retentate separation stage
3: Permeate separation stage
4: Single-stage or multi-stage compressor
5: Feed stream
6: First permeate stream
7: First retentate stream
8: Second retentate stream
9: Second permeate stream
10: Third retentate stream
11: Third permeate stream
12: Optional pressure relief valve in the first retentate stream 7
13: Optional pressure relief valve in the second retentate stream 8
14: Optional pressure relief valve in the third retentate stream 10
15: Vacuum pump (not shown in the FIGS.
16: Mixing chamber (not shown in the FIGS.
17: Crude gas stream

The invention claimed is:

1. A method for separating gases containing helium, wherein said method is carried out in an apparatus which comprises a feed stream separation stage, a retentate separation stage and a permeate separation stage, at least one compressor and/or at least one vacuum pump, and the feed stream separation stage separates a feed stream consisting of helium and at least one other component into a first permeate stream enriched with regard to helium compared to the feed stream, and a first retentate stream depleted with regard to helium compared to the feed stream, and the retentate separation stage separates the first retentate stream into a second permeate stream enriched with regard to helium compared to the first retentate stream, and a second retentate stream depleted with regard to helium compared to the first retentate stream, and the permeate separation stage separates the first permeate stream into a third retentate stream depleted with regard to helium compared to the first permeate stream , and a third permeate stream enriched with regard to helium compared to the first permeate stream, and the third permeate stream is removed as product or processed further and optionally the second retentate stream is removed as a first further product or processed further or discarded, and the second permeate stream and/or the third retentate stream is or are fed to the feed stream, and the first permeate stream is not subjected to a recompression, and wherein upon recycling the second permeate stream and the third retentate stream, the volume of the combined recycled stream comprises less than 50% by volume of the feed stream after combining with the crude gas stream, and wherein upon recycling the second permeate stream and the third retentate stream, the helium concentration after the first recycling of the second permeate stream and of the third retentate stream in the feed stream is increased, by at least 2% compared to the concentration in the crude gas stream.

2. An apparatus for separating gases containing helium, wherein said apparatus comprises a feed stream separation stage, a retentate separation stage, a permeate separation stage, at least one compressor, and/or at least one, vacuum pump, wherein the feed stream separation stage is designed such that it separates a feed stream consisting of helium and at least one other component into a first permeate stream enriched with regard to helium compared to the feed stream, and a first retentate stream depleted with regard to helium compared to the feed stream, and the retentate separation stage is designed to separate the first retentate stream into a second permeate stream enriched with regard to helium compared to the first retentate stream, and a second retentate stream depleted with regard to helium compared to the first retentate stream, and the permeate separation stage is designed to separate the first permeate stream into a third retentate stream depleted with regard to helium compared to the first permeate stream, and a third permeate stream enriched with regard to helium compared to the first permeate stream, and the apparatus is designed such that the third permeate stream can be removed as a product or processed further and optionally the second retentate stream can be removed as a further product or processed further or discarded, and the apparatus is designed such that the second permeate stream and/or the third retentate stream can be fed to the feed stream, and the apparatus is designed so that the first permeate stream is not subjected to a recompression, and wherein the apparatus is designed with a control such that upon recycling the second permeate stream and the third retentate stream, the volume of the combined recycled stream comprises less than 50% by volume of the feed stream after combining with the crude gas stream, and wherein upon recycling the second permeate stream and the third retentate stream, the recycling of the second permeate stream and of the third retentate stream is regulated such that the helium concentration after the first recycling of the second permeate stream and of the third retentate stream in the feed stream is increased compared to the concentration in the crude gas stream.

3. The apparatus according to claim 2, further comprising a gas separation membrane module with a mixed-gas selectivity for helium/methane of at least 40 that added to the feed stream separation stage, and optionally to the retentate separation stage and/or to the permeate separation stage.

4. The apparatus according to claim 3,
wherein the membrane optionally comprises a separation active layer and wherein the material used for the separation-active layer of the gas separation membrane or for the complete gas separation membrane in the gas separation membrane module is a polyimide of the general formula

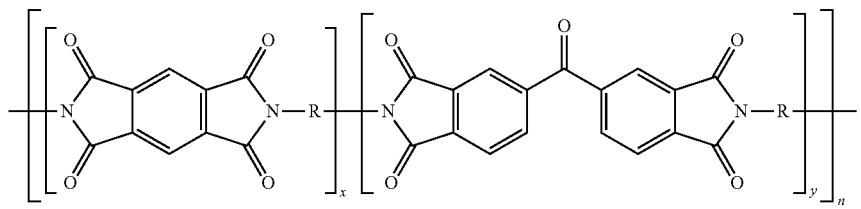

where R is selected from the group consisting of

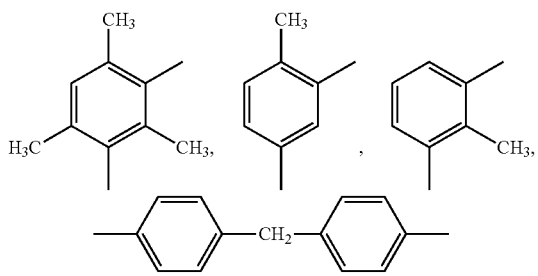

and where the mole fraction of x and y are 0<x<0.5 and 1>y>0.5.

5. The apparatus according to claim 4,
wherein the material used for the separation-active layer of the gas separation membrane is a polyimide comprising 10 to 90% by weight of

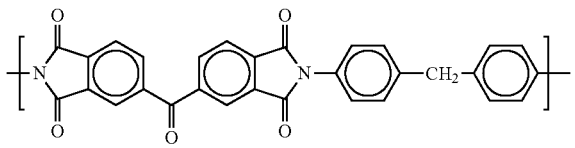

and 90 to 10% by weight of

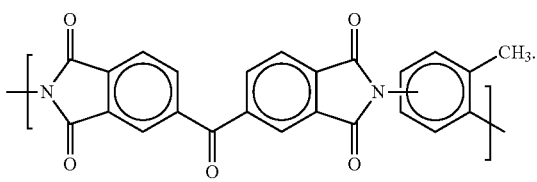

6. The apparatus according claim 2,
wherein
the second permeate stream and the third retentate stream on the suction side of the compressor are passed to the feed stream for reprocessing.

7. The apparatus according to claim 2, further comprising a multistage compressor.

8. The apparatus according to claim 7,
wherein the second permeate stream and/or the third retentate stream is introduced into the multistage compressor between two compression stages.

9. The apparatus according to claim 2,
wherein the first retentate stream and/or the second retentate stream and/or the third retentate stream are passed through a pressure relief valve.

10. The apparatus according to claim 2,
wherein the feed stream separation stage, the retentate separation stage and/or the permeate separation stage further comprises more than one gas separation membrane module connected in parallel and/or in series.

11. The apparatus according to claim 3,
wherein said gas separation membrane module further comprises hollow fibre membranes and/or flat membranes.

12. The apparatus according to claim 2,
wherein at least 95% of the helium introduced into the apparatus with the crude gas stream is removed from the system via the third permeate stream.

13. The apparatus according to claim 2,
wherein the pressure of the permeate side of the feed stream separation stage is adjusted by means of a pressure relief valve on the retentate side of the permeate separation stage to 1 to 30 bar.

14. The apparatus according to claim 2,
wherein the pressure of the first and second retentate stream is adjusted by means of a pressure relief valve in the second retentate stream to 1 to 100 bar.

15. The apparatus according to claim 3,
wherein a partial pressure difference is generated by a compressor in the feed stream and/or by a vacuum pump in the second and/or third permeate stream and/or by a flushing gas stream on the permeate-side.

16. The apparatus according claim 14,
wherein the pressure of the permeate of the feed stream separation stage is identical or increased compared with the ambient pressure.

17. The apparatus according to claim 15, wherein the pressure of the permeate of the feed stream separation stage is identical or increased compared with the ambient pressure.

18. A method for separating helium gas from at least one other component with the apparatus of claim 2.

19. A method according to claim 1 for separating gases containing helium, wherein said method is carried out in an apparatus which comprises a feed stream separation stage, a retentate separation stage and a permeate separation stage, at least one compressor and/or at least one vacuum pump, and the feed stream separation stage separates a feed stream consisting of helium and at least one other component into a first permeate stream enriched with regard to helium compared to the feed stream, and a first retentate stream depleted with regard to helium compared to the feed stream, and the retentate separation stage separates the first retentate stream into a second permeate stream enriched with regard to helium compared to the first retentate stream, and a second retentate stream depleted with regard to helium compared to the first retentate stream, and the permeate separation stage separates the first permeate stream into a third retentate stream depleted with regard to helium compared to the first permeate stream, and a third permeate stream enriched with regard to helium compared to the first permeate stream, and the third permeate stream is removed as product or processed further, and the second permeate stream is fed to feed stream, and the second retentate stream is removed as a first further product or processed further or discarded, and the third retentate stream is fed to the feed stream or discarded, and the first permeate stream is not subjected to a recompression, and wherein upon recycling the second permeate stream and optionally the third retentate stream, the volume of the optionally combined recycled stream comprises less than 50% by volume of the volume of the feed stream after combining with the crude gas stream, and wherein upon recycling the second permeate stream and optionally the third retentate stream, the helium concentration after the first recycling of the second permeate stream and optionally of the third retentate stream in the feed stream is increased by at least 2% compared to the concentration in the crude gas stream.

20. A method according to claim 1 for separating gases containing helium, wherein said method is carried out in an apparatus which comprises a feed stream separation stage, a retentate separation stage and a permeate separation stage, at least one compressor and/or at least one vacuum pump, and the feed stream separation stage separates a feed stream consisting of helium and at least one other component into a first permeate stream enriched with regard to helium compared to the feed stream, and a first retentate stream depleted with regard to helium compared to the feed stream, and the retentate separation stage separates the first retentate stream into a second permeate stream enriched with regard to helium compared to the first retentate stream, and a second retentate stream depleted with regard to helium compared to the first retentate stream, and the permeate separation stage separates the first permeate stream into a third retentate stream depleted with regard to helium compared to the first permeate stream, and a third permeate stream enriched with regard to helium compared to the first permeate stream, and the third permeate stream as product and the second retentate stream as second product are each either removed as product or processed further, the second permeate stream is discarded, and the third retentate stream is fed to the feed stream or discarded, and the first permeate stream is not subjected to a recompression, and wherein upon recycling the third retentate stream, the volume of the recycled stream comprises less than 50% by volume of the volume of the feed stream after combining with the crude gas stream, and wherein upon recycling the third retentate stream, the helium concentration after the first recycling of the third retentate stream in the feed stream is increased by at least 2% compared to the concentration in the crude gas stream.

21. An apparatus for separating gases containing helium, wherein said apparatus comprises a feed stream separation stage, a retentate separation stage, a permeate separation stage, at least one compressor, and/or at least one, vacuum pump, wherein the feed stream separation stage is designed such that it separates a feed stream consisting of helium and at least one other component into a first permeate stream enriched with regard to helium compared to the feed stream, and a first retentate stream depleted with regard to helium compared to the feed stream, and the retentate separation stage is designed to separate the first retentate stream into a second permeate stream enriched with regard to helium compared to the first retentate stream, and a second retentate stream depleted with regard to helium compared to the first retentate stream, and the permeate separation stage is designed to separate the first permeate stream into a third retentate stream depleted with regard to helium compared to the first permeate stream, and a third permeate stream enriched with regard to helium compared to the first permeate stream, and the apparatus is designed to remove the third permeate stream as product or processed further, and the apparatus is designed to feed the second permeate stream to feed stream, and the apparatus is designed to remove the second retentate stream as a first further product or processed further or discarded, and the apparatus is designed to feed the third retentate stream to the feed stream or discarded, and the apparatus is designed so that the first permeate stream is not subjected to a recompression, and wherein the apparatus is designed with a control such that upon recycling the second permeate stream and optionally the third retentate stream, the volume of the optionally combined recycled stream comprises less than 50% by volume of the feed stream after combining with the crude gas stream, and wherein upon recycling the second permeate stream and optionally the third retentate stream, the recycling of the second permeate stream and optionally of the third retentate stream is regulated such that the helium concentration after the first recycling of the second permeate stream and of the third retentate stream in the feed stream is increased compared to the concentration in the crude gas stream.

22. An apparatus for separating gases containing helium, wherein said apparatus comprises a feed stream separation stage, a retentate separation stage, a permeate separation stage, at least one compressor, and/or at least one, vacuum pump, wherein the feed stream separation stage is designed such that it separates a feed stream consisting of helium and at least one other component into a first permeate stream enriched with helium compared to the feed stream, and a first retentate stream depleted with regard to helium compared to the feed stream, and the retentate separation stage is designed to separate the first retentate stream into a second permeate stream enriched with regard to helium compared to the first retentate stream, and a second retentate stream depleted with regard to helium compared to the first retentate stream, and the permeate separation stage is designed to separate the first permeate stream into a third retentate stream depleted with regard to helium compared to the first permeate stream, and a third permeate stream enriched with regard to helium compared to the first permeate stream, and the apparatus is designed to remove the each of the second retentate stream and the third permeate stream as product or to further process each of the second retentate stream and the third permeate stream, and the apparatus is designed to discard the second permeate stream to feed stream, and the apparatus is designed to feed or discard the third retentate stream is fed to the feed stream, and the apparatus is designed to so that the first permeate stream is not subjected to a recompression, and wherein the apparatus is designed with a control such that upon recycling the third retentate stream, the volume of the recycled stream comprises less than 50% by volume of the feed stream after combining with the crude gas stream, and wherein upon recycling the third retentate stream, the helium concentration after the first recycling of the third retentate stream in the feed stream is increased compared to the concentration in the crude gas stream by at least 2% compared to the concentration in the crude gas stream.

* * * * *